United States Patent
Mathewson, II et al.

(10) Patent No.: US 7,668,539 B2
(45) Date of Patent: Feb. 23, 2010

(54) METHOD AND SYSTEM FOR ENHANCED MANAGEMENT OF MISSED PHONE CALLS

(75) Inventors: James M. Mathewson, II, Chapel Hill, NC (US); Steven M. Miller, Cary, NC (US); Anandha S. Srinivasan, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 11/461,829

(22) Filed: Aug. 2, 2006

(65) Prior Publication Data

US 2008/0032687 A1 Feb. 7, 2008

(51) Int. Cl.
*H04M 3/42* (2006.01)
*H04M 1/56* (2006.01)

(52) U.S. Cl. .............. 455/415; 379/142.02; 379/142.06

(58) Field of Classification Search ................. 455/415, 455/414, 418, 420, 428, 445, 550.1, 566.2, 455/567; 379/142, 245, 14, 1, 142.01, 142.04, 379/14.06, 142.1, 219, 223
See application file for complete search history.

(56) References Cited

U.S. PATENT DOCUMENTS 6,741,836 B2 *  5/2004  Lee et al. .................. 455/41.2
2003/0153364 A1 *  8/2003  Osann, Jr. .................. 455/567
2004/0202300 A1  10/2004  Cooper et al.
2004/0213401 A1  10/2004  Aupperle et al.
2005/0063365 A1   3/2005  Mathew et al.
2005/0191969 A1   9/2005  Mousseau
2005/0250551 A1  11/2005  Helle
2006/0009203 A1 *  1/2006  Kim .......................... 455/415

FOREIGN PATENT DOCUMENTS

JP    11177616 A   *  7/1999
WO    03103262 A1     12/2003

* cited by examiner

*Primary Examiner*—George Eng
*Assistant Examiner*—Ezana Getachew
(74) *Attorney, Agent, or Firm*—Hoffman & Warnick LLP

(57) ABSTRACT

The present invention is a method of managing missed calls providing a calling party, who initiates a call that is not pick-up by a called party (i.e., intended recipient), the autonomy to retain or delete telephone number of calling party in phone registered on the called party phone as caller identification (ID) through a mobile service provider (MSP) of a telecommunications network. The method may be implemented as part of a telecommunication system or as part of a computer program. Also, provided is a method and system for calling party to create annotation in a mobile service provider system parenthetical information for called party to retrieve or to alert called party.

22 Claims, 4 Drawing Sheets

METHOD AND SYSTEM FOR ENHANCED MANAGEMENT OF MISSED PHONE CALLS

BACKGROUND OF THE INVENTION

1. Technical Field

The invention relates generally to a method of managing missed telephone calls by a calling party. Particularly, the method relates to providing a calling party a way to remove or annotate a record of a missed call to save a called party the need to follow-up on a missed call.

2. Background Art

Generally, records of missed calls do not provide sufficient information to guide a recipient of a missed call on the necessary follow-up actions, where necessary. The common reaction to a missed call is to revert to the calling party who had initiated the missed call by returning a call and/or sending a text message through telecommunications systems or by other means of communication.

Current treatment of missed calls by a calling party includes leaving a voice mail or following-up with a text message detailing the reason(s) for the call and what requisite actions are sought by the calling party. Very often, a recipient or called party will return a call to the calling party to find out what action(s) are required. Usually, the called party reverts to the calling party by returning a call to follow-up on the missed call. Very often the action required by the initial call (i.e. missed by called party) is already fulfilled by the time the called party returns a call. This becomes a waste of time, effort and attention.

In view of the foregoing, there is a need in the art for a solution to the problems of the related art.

SUMMARY OF THE INVENTION

The present invention includes an embodiment disclosing a method of managing missed calls providing a calling party, who initiates a call that is not pick-up by intended recipient (i.e. a called party), the autonomy to annotate, retain or delete a telephone number of calling party phone registered as caller identification (ID) in the called party phone through a public switch telephone network (PSTN), voice over internet protocol (VOIP), mobile service or other provider of a telecommunications network. The method may be implemented as part of a telecommunication system or as part of a computer program.

A first aspect of the invention provides a method for managing a missed call, the method comprising: registering a missed call in a phone of a calling party when a called party does not pick up a call; registering a calling party phone number as a caller identification (ID) in a called party phone; registering a timeout value from the calling party; sending the timeout value to the called party phone; comparing the timeout value against a current time in the called party phone; and deleting the caller (ID) of a caller ID register in the called party phone if the timeout value matches the current time.

A second aspect of the invention provides a system for managing a missed call, the method comprising: a system for registering a missed call in a calling party phone when a called party does not pick up a call; a system for registering a calling party phone number as a caller ID in the called party phone; a system for registering a timeout value from the calling party; a system for sending the timeout value to the called party phone; a system for comparing the timeout value against a current time in the called party phone; and a system for deleting the caller (ID) of calling party from the system for registering a calling party phone number when the timeout value matches the current time.

In a third aspect, invention provides a computer program stored on a machine-readable medium for managing a missed call, the computer program including program code for: registering a missed call in a calling party phone when a called party does not pick up a call; registering a calling party phone number as a caller identification (ID) in the called party phone; registering a timeout value from the calling party; synchronizing time in the calling party phone with time in the called party phone; sending the timeout value to the called party phone; comparing timeout values against a current time in the called party phone; and deleting caller (ID) of the calling party from a caller ID register in the called party phone when the timeout value matches the current time.

A fourth aspect of the invention provides a method for managing a missed call, the method comprising: registering a missed call in a calling party phone when a called party does not pick up a call; providing the calling party an option to create a parenthetical information on the missed call in a mobile service provider system for the called party; and registering a calling party phone number as a caller identification (ID) in the called party phone.

In a fifth aspect, the invention provides a method for deploying an application for managing a missed call, the method comprising: providing a computer infrastructure being operable to: register a missed call in a calling party phone if a called party does not pick-up a call; register a calling party phone number as a caller identification (ID) in a called party phone; register a timeout value from the calling party; send the timeout value to the called party phone; compare the timeout value against a current time in the called party phone; and delete the caller ID from a caller ID register in the called party phone if the timeout value matches the current time.

The illustrative aspects of the present invention are designed to solve the problems herein described and other problems not discussed which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

The present invention provides a method of managing missed calls. The invention may employ a telecommunication system such as a mobile telecommunication system which may include: global system for mobile (GSM) communication, internet protocol (IP) telephony system, universal mobile telecommunication system (UMTS), 3G telephony, code division multiple access (CDMA), wide-band code division multiple access W-CDMA telecommunication system.

Figure 1:
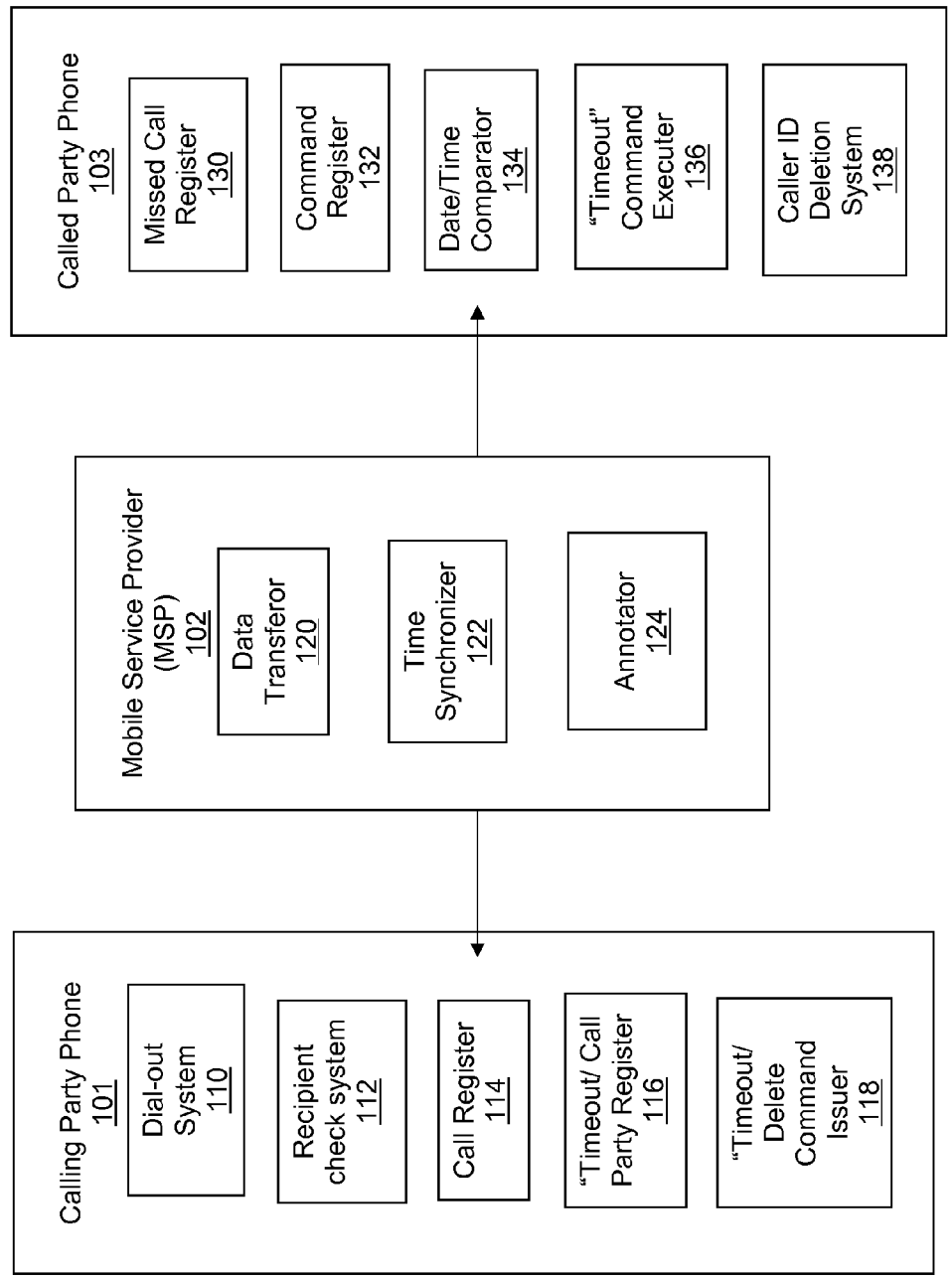
FIG. 1 is a block diagram of a telecommunication system according to an embodiment of the present invention.

FIG. 1 illustrates a telecommunication system 10 for enabling a calling party to manage missed calls registered in a called party phone (i.e., recipient phone) in accordance with embodiments of the present invention. The calling party phone 101 connects to the called party phone 103 via a mobile service provider (MSP) 102. The MSP 102 may include a data transferor 120 and time synchronizer 122. When calling party phone 101 initiates a call using a dial-out system 110 to called party phone 103 via the MSP 102, a recipient check system 112 registers a missed call in a call register 114 when the called party 103 does not pick-up the call. At the same time, the missed call is registered by storing the caller identification (ID) of the calling party in missed call register 130 in the called party phone 103. In the calling party phone, a timeout/call party register 116 is activated to prompt calling party if an expiry date or timeout value is desired to remove the caller ID registered in the called party phone 103. If the calling party elects to set an expiry on the caller ID in the missed call register 130 of the called party phone 103, time synchronizer 122 may synchronize times between calling party phone 101 and called party phone 103. The timeout value is then registered with a timeout/call party register 116. Through a timeout/delete command issuer 118, a command to delete the caller ID is carried via data transferor 120 to called party phone 103. Within the called party phone 103, a command register 132 receives the command to delete from the timeout/delete command issuer 118 and directs a date/time comparator 134 to compare the timeout value/expiry date with the current date. Where the timeout value/expiry date matches current date, a timeout command executer 136 executes the command to delete through a caller ID deletion system 138.

Figure 2:
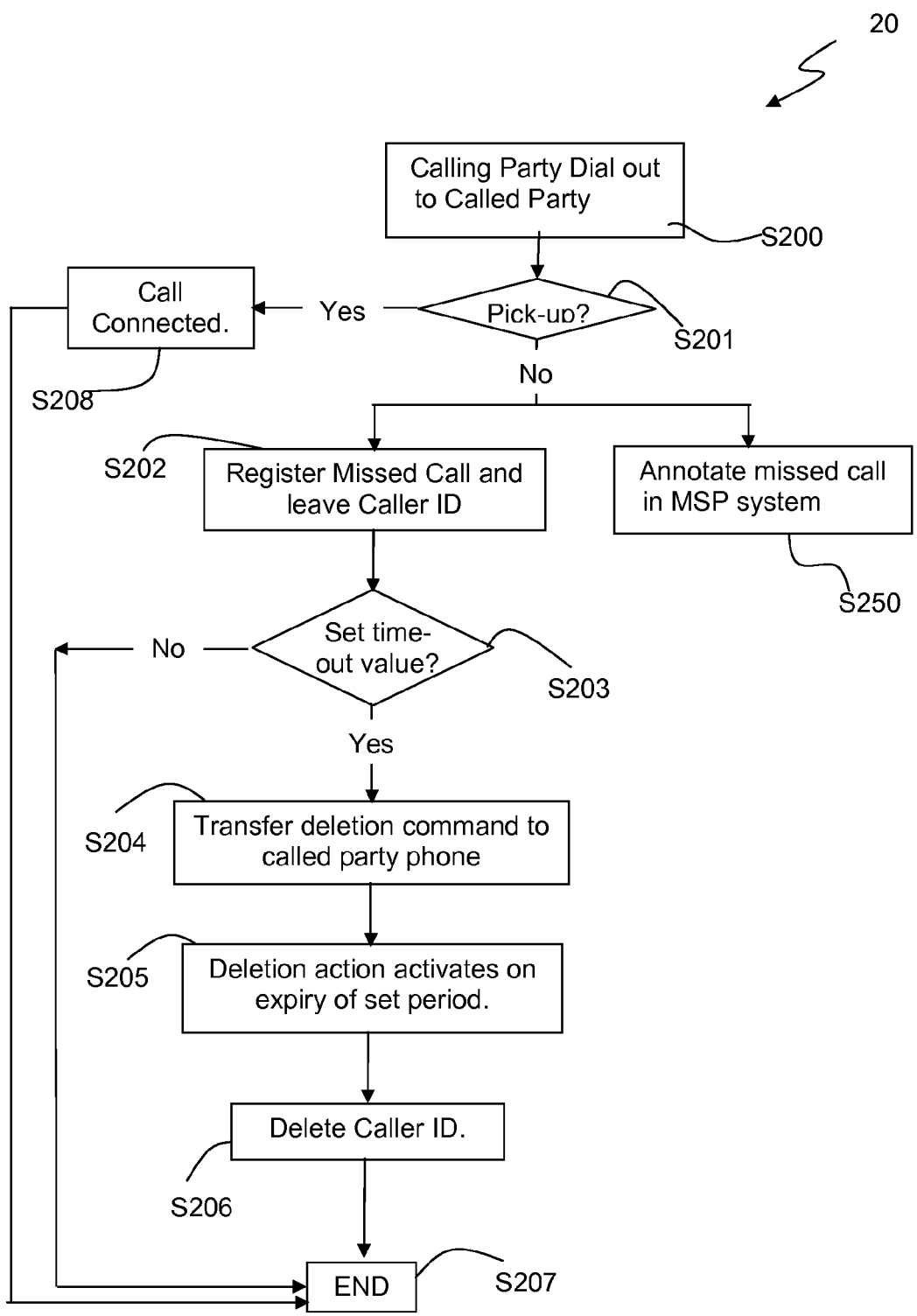
FIG. 2 is a flow diagram of an embodiment of a method of the present invention.

FIG. 2 shows a flow diagram 20 illustrating a method of one embodiment of the present invention in relation to the telecommunication system 10 illustrated in FIG. 1. Calling party dials out to called party at step S200 via dial-out system 110 where recipient check system 112 performs a check 201 to determine if the called party picks up the call. If the call is picked-up (i.e., YES at step S201), the call is connected at step S208 and ends at S207. If the call is not picked-up (i.e., NO at step S201), a missed call is registered at step S202 using call register 114 in the calling party phone and the calling party phone number is registered as a caller ID in missed call register 130. Next at step S203, calling party is asked if a timeout value of the caller ID registered in called party phone is desired. If not desired (i.e., NO at step S203), the method ends at step S207. Where the calling party desires for the caller ID to be removed from the missed call register 130 in the called party phone (i.e., YES at step S203) at step S204, timeout register 116 registers the expiry date or timeout value set by the calling party and transfers the same with deletion command to command register 132 in called party phone 103 via timeout command issuer 118 over data transferor 120 in the MSP 102. The command register 132 then initiates deletion action at step S205 through timeout command executer 136 to have the caller ID deleted at step S206 by caller ID deletion system 138.

Figure 3:
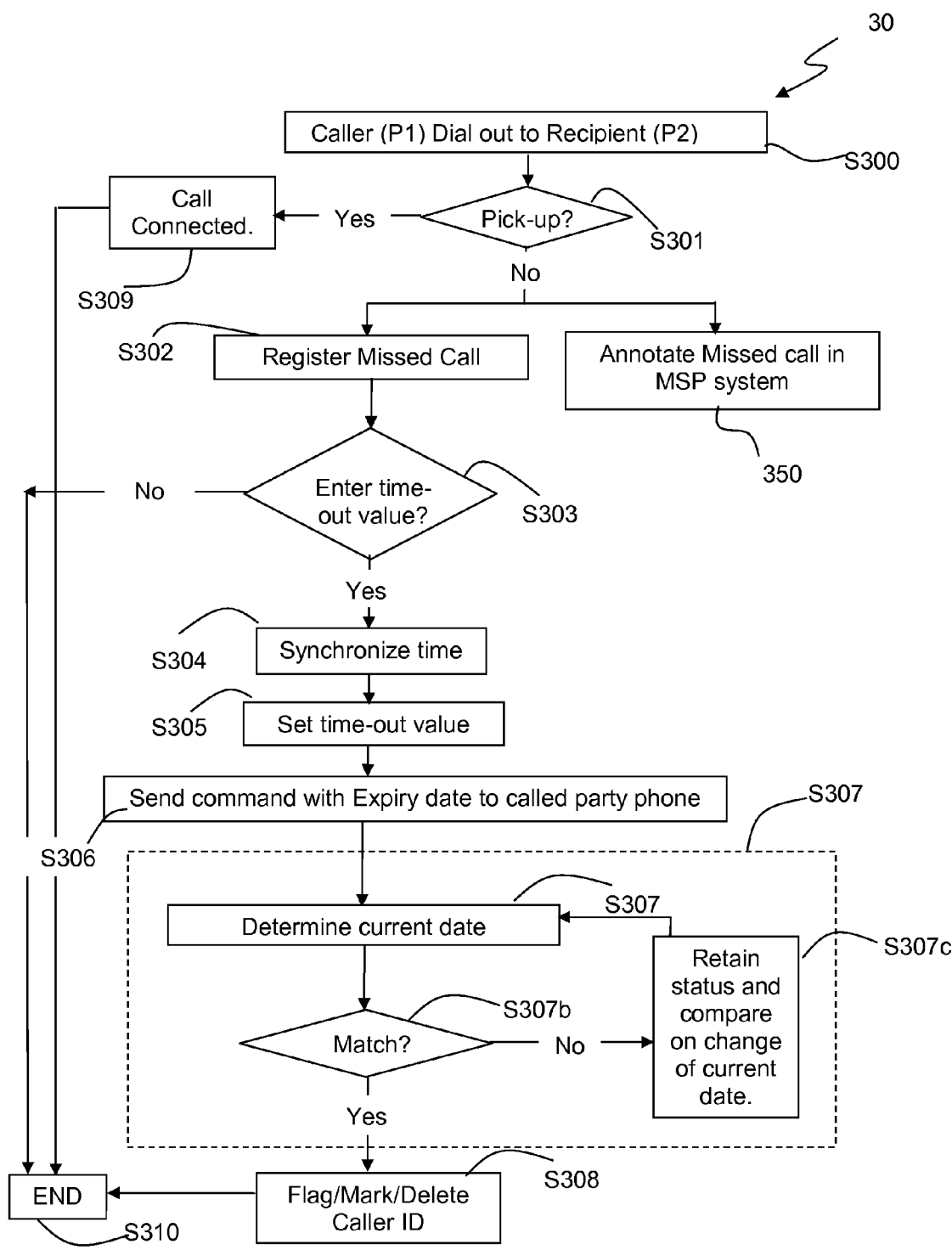
FIG. 3 is a flow diagram of another embodiment of a method of the present invention.

In another embodiment of the present invention, a method of employing telecommunication system 10 in FIG. 1 is illustrated in the flow diagram 30 in FIG. 3. Process steps 300, 301, 302 and 303 correspond to process steps 200, 201, 202 and 203 in FIG. 2 respectively. Where no timeout value is set by the calling party (i.e., NO at step S303), the method ends at step S310. Where a calling party desires to set a timeout value (i.e., YES at step S303), time synchronizer 122 synchronizes the time at step S304 between calling party phone 101 and called party phone 103 through MSP 102. On receipt of a timeout value (e.g. expiry date) stored in timeout register 116 at step S305, the timeout value is included with the deletion command from timeout command issuer 118 and transferred at step S306 by data transferor 120 in MSP 102 to command register 132 in called party phone 103. The command may take the form of a short message service (SMS) protocol from the calling party phone 101 to the called party phone 102 with a special text (e.g. "$$RM#RM#RM$$ ttt", where "ttt" is the timeout value). At step S307, the date/time comparator 134 in called party phone 103 determines the current date at step S307a and compares the current date to the time out value at step 307b. If there is no match (i.e., NO at step S307b), the timeout value is retained at step S307c in command register 132 until a change in current date/time occurs which triggers a repeat of step S307. If a match occurs (i.e., YES at step S307b), the caller ID of calling party phone 101 from missed call register 130 in called party phone 103 may be flagged/marked differently from other caller ID by time command executer 136 at step S308. Alternatively, the caller ID may be deleted by caller ID deletion system 138 at step S308. On a change in the marking or deletion of caller ID, the method ends at step S310.

Figure 4:
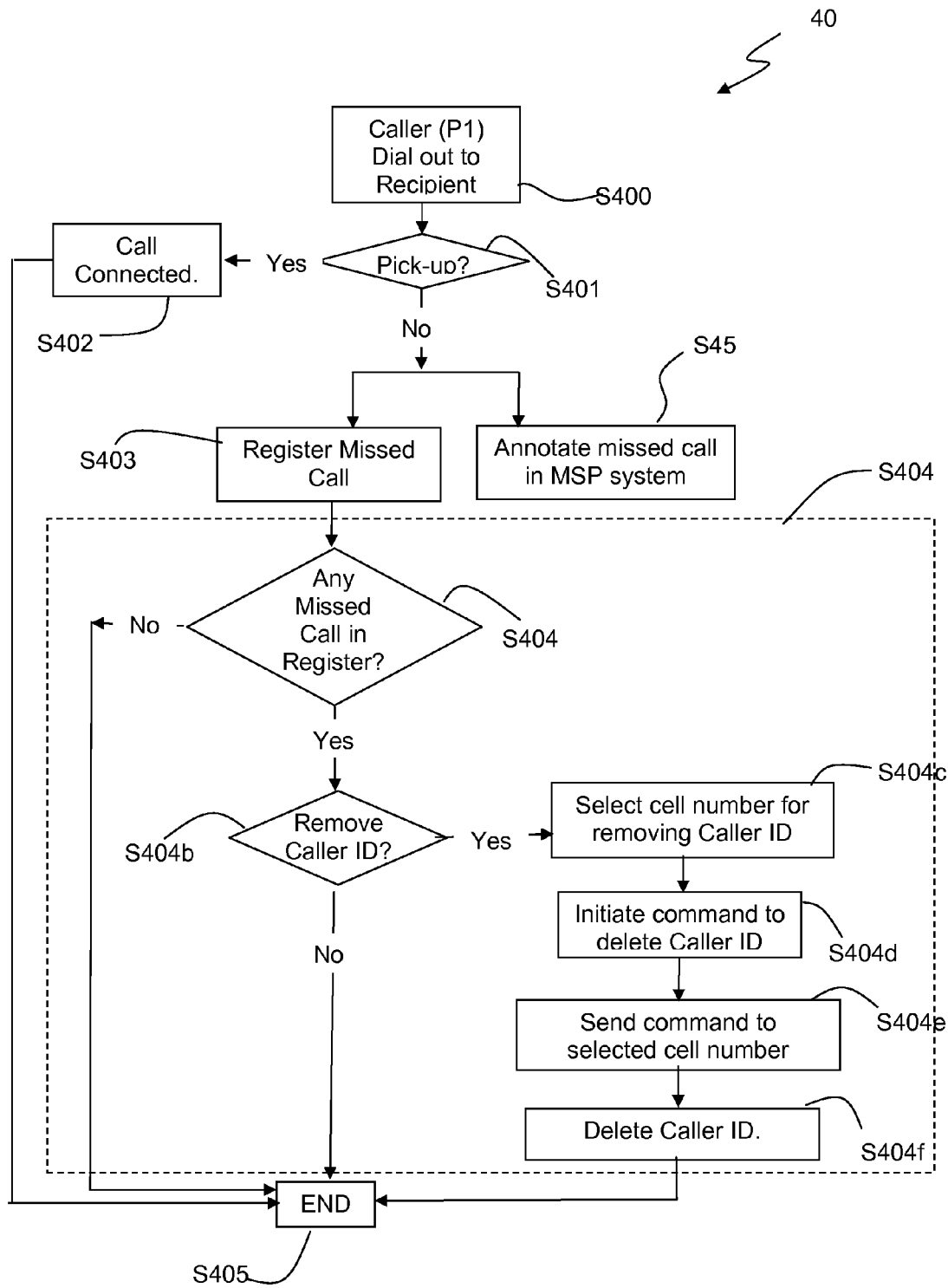
FIG. 4 is a flow diagram of yet another embodiment of a method of the present invention.

In FIG. 4, another method employing telecommunication system 10 illustrated in FIG. 1 is shown. As shown, step S404 includes a plurality of substeps, steps S404a through S404f. Substeps S404a-S404f and step S405 may be executed independently from steps S400-S403. For example, when the initial call is not picked-up by the called party, the calling party may elect to hang-up. In a different session, the calling party places an annul call to the called party to initiate an annulling process through a remove/annul call function in the calling party phone. Accordingly, at step S404a, a calling party performs a check on any missed call stored in call register 114 of calling party phone 101. If there are no missed calls in call register 114, the method ends at step S310. If there is a missed call (i.e., YES at step S404a) at step S404b, calling party decides whether to delete caller ID from missed call register 130 in called party phone 103. If so (i.e., YES at step S404b), at step S404c calling party selects a called party phone number from the call register 114 for deletion, timeout/delete command issuer 118 is initiated at step S404d and sends a deletion command to caller ID deletion system 138 in selected called party phone 103 at step S404e. This deletion command may take the form of a text message with special characters or sequence of characters, for example, "$$RM#RM#RM$4" using the short message service (SMS) protocol which is transferred to the called party phone 103 over the MSP 102 like any text message. On receiving the deletion command, the called party phone 103, through timeout command executer 136 deletes the caller ID at step S404f, after which the method ends at step 405. Calling party can repeat the entire process to delete other missed calls in the missed call register 130. The same method may be applied to flag the caller ID instead of deleting the caller ID.

Further to the methods illustrated in FIGS. 2, 3 and 4, additional embodiments of the invention provide an annotation protocol or an indication/alert system represented as steps S250, S350 and S450, where parenthetical information from or on behalf of the calling party is stored in the mobile service provider (MSP) system. Such parenthetical information can be left as a missed call message like that of a voicemail by the calling party for the called party to retrieve. The MSP system provides a voice prompt menu as part of a voicemail application or other similar system to the calling party to select or specify the manner in which parenthetical information should be annotated. The calling party could use this to determine content of the annotation. This could be accomplished using, for example, dual tone multi-frequency (DTMF)/touch tone signaling, voice recognition or other techniques to capture calling party input. The annotation protocol may also provide the calling party the option to flag or rate the importance of the call missed by the called party and alert the called party using, for example, a short message system, email or any other alternative communication system. The annotation protocol may also tie the MSP system to the missed call register in the called party phone via telecommunication networks with the annotation that, for example, a voice message has been left by the calling party.

Returning to FIG. 1, the system 10 incorporates discrete computer infrastructures: 101 in calling party phone and 103 in the called party phone linked by computer infrastructure 102 in mobile service provider (MSP) for performing various process steps described herein for managing missed calls initiated by calling party. Each computer infrastructure 101, 102 and 103 comprises of various computing components. In particular, computer infrastructure 101 of calling party phone comprises: a dial-out system 110 for dialing called party phone number to connect a call initiated by calling party; a recipient check system 112 for determining picked-up of call by called party; a call register 114 for registering the called party phone number; a timeout register 116 for registering a timeout value/expiry date/time of missed call; a timeout command issuer 118 for sending timeout value with deletion command or timeout value with change of statue command to called party phone via MSP 102. Where computer infrastructure of mobile service provider (MSP) 102 comprises: a data transferor 120 for transferring user information like caller identification (ID), timeout value, deletion or change of status command to called party; a time synchronizer 122 for synchronizing the time of calling party phone with time in called party phone; and an annotator for enabling calling party to create parenthetical information for called party to retrieve or to alert called party. Computer infrastructure 103 of called party phone comprises: a missed call register 130 for registering missed calls; a command register 132 for storing commands received form calling party; a date/time comparator 134 for comparing timeout value/expiry date/time with current time; a timeout command executor 136 for initiating or executing commands received from timeout command issuer 118 of calling party phone; a caller ID deletion system 138 to delete calling party phone number from missed call register 130. In this case, the functionality described in conjunction with each computing component in the respective computer infrastructures can be enabled by computer program code.

In another embodiment, the invention provides a business method that performs the process steps of the invention on a subscription, advertising, and/or fee basis. That is, a service provider (e.g., a MSP) could offer to determine if caller ID of a calling party should be deleted from a missed call register. In this case, the service provider can create, maintain, support, etc., a computer infrastructure, such as the computer infrastructure 102, that performs the process steps of the invention for one or more customers. In return, the service provider can receive payment from the customer(s) under a subscription and/or fee agreement and/or the service provider can receive payment from the sale of advertising space to one or more third parties.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

In any event, the respective computer infrastructures 101, 102 and 103 can comprise any general purpose computing components of manufacture capable of executing computer program code installed by a user (e.g., a personal computer, server, handheld device, etc.). However, it is understood that the afore-described computing components in the respective computer infrastructures 101, 102 and 103 are only representative of various possible computer systems that may perform the various process steps of the invention. To this extent, in other embodiments, the computer infrastructures 101, 102, and 103 may comprise any specific purpose computing components of manufacture comprising hardware and/or computer program code for performing specific functions, any computing components of manufacture that comprises a combination of specific purpose and general purpose hardware/software, or the like. In each case, the program code and hardware can be created using standard programming and engineering techniques, respectively.

Similarly, the computer infrastructures 101, 102 and 103 are merely illustrative of various types of computer infrastructures that can be used to implement the invention. For example, when the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for managing a missed call, the method comprising:
   registering a missed call in a phone of a calling party when a called party does not pick up a call;
   registering a calling party phone number as a caller identification (ID) in a called party phone;
   registering a timeout value from the calling party;
   sending the timeout value to the called party phone;
   comparing the timeout value against a current time in the called party phone; and
   deleting the caller (ID) of a caller ID register in the called party phone if the timeout value matches the current time.

2. The method according to claim 1, further comprising synchronizing a time in the calling party phone with a time in the called party phone.

3. The method according to claim 1, wherein sending is conducted via a telecommunications network.

4. The method according to claim 3, wherein the telecommunications network includes a short message service protocol.

5. The method according to claim 1, wherein the timeout value includes a date for triggering deletion of the caller ID from the call register.

6. The method according to claim 1, wherein a mobile service provider sends the timeout value to the called party phone via the telecommunications network.

7. The method according to claim 1, wherein the sending occurs independently in a follow-up call operation.

8. The method according to claim 1, further comprising annotating parenthetical information for called party.

9. A system for managing a missed call, the method comprising:
- a system for registering a missed call in a calling party phone when a called party does not pick up a call;
- a system for registering a calling party phone number as a caller ID in the called party phone;
- a system for registering a timeout value from the calling party;
- a system for sending the timeout value to the called party phone;
- a system for comparing the timeout value against a current time in the called party phone; and
- a system for deleting the caller (ID) of calling party from the system for registering a calling party phone number when the timeout value matches the current time.

10. The system of claim 9, further comprising a system for transferring the timeout value issued by timeout issuer from calling party phone to called party phone via a telecommunication network.

11. The system of claim 10 wherein the telecommunications network includes a short message service protocol.

12. The system of claim 9 further includes a system for synchronizing time in the calling party phone with time in the called party phone.

13. The system of claim 9, further comprising a system for storing timeout values received from the timeout issuer.

14. The system of claim 9, further comprising a time comparator for comparing timeout values in the timeout register with the current time to determine removal of caller ID.

15. The system of claim 9, further comprising a system for verifying with calling party on choice of removing the missed call from the call register in the called party phone.

16. The system of claim 10, further comprising a mobile service provider for sending the timeout value to the called party phone via the telecommunications network.

17. The system of claim 10, further comprising an annotator for creating parenthetical information for called party.

18. A computer readable medium for storing a program product for managing a missed call, the program product including program code for:
- registering a missed call in a calling party phone when a called party does not pick up a call;
- registering a calling party phone number as a caller identification (ID) in the called party phone;
- registering a timeout value from the calling party;
- synchronizing time in the calling party phone with time in the called party phone;
- sending the timeout value to the called party phone;
- comparing timeout values against a current time in the called party phone; and
- deleting caller (ID) of the calling party from a caller ID register in the called party phone when the timeout value matches the current time.

19. The program product of claim 18, further includes a program code for enabling a mobile service provider to initiate sending of the timeout value to the called party phone via a telecommunications network.

20. The program product of claim 18, further includes a program code for enabling the calling party to initiate the sending of the timeout value to the called party phone independently in a follow-up operation from the missed call.

21. The program product of claim 18, further includes a program code for enabling the calling party to select and create parenthetical information for called party.

22. A method for deploying an application for managing a missed call, the method comprising:
providing a computer infrastructure being operable to:
- register a missed call in a calling party phone if a called party does not pick-up a call;
- register a calling party phone number as a caller identification (ID) in a called party phone;
- register a timeout value from the calling party;
- send the timeout value to the called party phone;
- compare the timeout value against a current time in the called party phone; and
- delete the caller ID from a caller ID register in the called party phone if the timeout value matches the current time.

* * * * *